United States Patent
Chambers et al.

(10) Patent No.: US 9,083,751 B2
(45) Date of Patent: Jul. 14, 2015

(54) METHOD FOR CLOUD-BASED ACCESS CONTROL POLICY MANAGEMENT

(71) Applicant: Cisco Technology, Inc., San Jose, CA (US)

(72) Inventors: Benjamin A. Chambers, San Francisco, CA (US); Clifford A. Frey, San Francisco, CA (US); Raluca Musaloiu-Elefteri, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 127 days.

(21) Appl. No.: 14/011,517

(22) Filed: Aug. 27, 2013

(65) Prior Publication Data

US 2014/0068705 A1 Mar. 6, 2014

Related U.S. Application Data

(60) Provisional application No. 61/695,995, filed on Aug. 31, 2012.

(51) Int. Cl.
 *H04L 29/06* (2006.01)
 *H04L 12/24* (2006.01)

(52) U.S. Cl.
 CPC ............ *H04L 63/20* (2013.01); *H04L 41/0253* (2013.01); *H04L 41/0813* (2013.01); *H04L 63/08* (2013.01); *H04L 63/10* (2013.01)

(58) Field of Classification Search
 None
 See application file for complete search history.

(56) References Cited

U.S. PATENT DOCUMENTS

| | | | | |
|---|---|---|---|---|
| 6,085,191 A * | 7/2000 | Fisher et al. | ................... | 707/737 |
| 6,611,863 B1 * | 8/2003 | Banginwar | ................... | 709/220 |
| 2004/0090930 A1 * | 5/2004 | Lee et al. | ....................... | 370/328 |
| 2005/0149759 A1 * | 7/2005 | Vishwanath et al. | ......... | 713/201 |
| 2005/0277420 A1 * | 12/2005 | Shin et al. | ...................... | 455/442 |
| 2006/0090196 A1 * | 4/2006 | van Bemmel et al. | ............ | 726/4 |
| 2009/0249458 A1 * | 10/2009 | Banga et al. | ....................... | 726/7 |
| 2012/0023217 A1 * | 1/2012 | Wakumoto | ..................... | 709/223 |
| 2012/0047554 A1 * | 2/2012 | Mihara et al. | ...................... | 726/1 |
| 2012/0197980 A1 * | 8/2012 | Terleski et al. | ................ | 709/203 |
| 2013/0111541 A1 * | 5/2013 | Yin et al. | ............................ | 726/1 |
| 2014/0053227 A1 * | 2/2014 | Ruppin et al. | ..................... | 726/1 |

* cited by examiner

*Primary Examiner* — Dede Zecher
*Assistant Examiner* — Richard McCoy
(74) *Attorney, Agent, or Firm* — Novak Druce Connolly Bove + Quigg LLP (57) ABSTRACT

A Web-based management server includes an ACP manager to manage access control rules (ACRs) and access control policies (ACPs). The ACRs and ACPs are configured by an administrator via a Web interface of the management server. The ACP manager is to transmit over the Internet the ACPs and the ACRs to network access devices (NADs) to allow the NADs to apply the ACPs to their respective network client devices (NCDs) based on the ACRs, where the NADs are managed by the management server over the Internet. Each of the NADs operates as one of a router, a network switch, and an access point. The ACP manager is to periodically update the ACRs and ACPs stored in the NADs, including receiving an update from one NAD and broadcasting the update to a remainder of the NADs.

22 Claims, 9 Drawing Sheets

ACR Log
120

| version | operation | MAC address | policy | expiration |
|---|---|---|---|---|
| 100 | add | 00:00:01:02:03:04 | policy_id 105 | never |
| 101 | add | 00:00:01:02:03:05 | policy_id 105 | 2020/4/20 12:00 |
| 102 | delete | 00:00:01:02:03:04 | | |
| 103 | add | 00:00:01:02:03:06 | policy_id 110 | never |

METHOD FOR CLOUD-BASED ACCESS CONTROL POLICY MANAGEMENT

RELATED APPLICATIONS

This application claims the benefit of U.S. Provisional Patent Application No. 61/695,995, filed Aug. 31, 2012, which is incorporated by reference herein in its entirety.

FIELD OF THE INVENTION

Embodiments of the present invention relate generally to networking. More particularly, embodiments of the invention relate to managing access control policies over the Internet.

BACKGROUND

A physical local area network (LAN) may include numerous network access devices (e.g., routers, switches, wireless access points, etc.) that communicate with one another (either directly or indirectly) to provide computing device(s) (e.g., laptop, smartphone, etc.) access to a wide area network (WAN). Thus, a network access device (NAD) is a piece of networking equipment, including hardware and software, which communicatively interconnects other equipment on the LAN (e.g., other network elements, computing devices). The WAN can include, for example, the Internet, where communication with the WAN is through an interface such as T1, T3, cable, Digital Subscriber Line (DSL), wireless (e.g., mobile cell tower), or the like.

The one or more of the network access devices within the LAN that are directly coupled to the WAN or directly coupled to an interface device (e.g., a DSL modem) act as a gateway node for the LAN (a gateway to the WAN) for the other network access devices and network computing devices in the LAN. Network access devices that rely on (communicate with) one or more other network access devices to reach the WAN act as intermediate nodes of the LAN.

Generally the access control rules must either be configured manually on each network access device (e.g. individual access points or switches), or if a controller based system is used then the rules are configured on the controller. Configuring access control rules manually on each network access device is cumbersome, time-consuming and error-prone. Using a controller-based system simplifies this somewhat, but controllers are expensive and can only support a limited number of network access devices each, after which additional controllers must be deployed and access control rules synchronized between them. Also, if many network access devices are located in geographically disparate locations, synchronizing the access control rules can be confusing.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for managing access control rules (ACRs) and/or access control policies (ACPs) in a centralized manner are described herein. According to some embodiments, a cloud-based system is provided for specifying access control rules for a large number of specific network client devices (NCDs) that are using a computer network (either wireless or wired). The system is designed to function with large numbers of client devices, authorized for varying and potentially long periods of time, and even if the network access devices (NADs) (e.g., routers, wireless access points, network switches or firewalls, etc) are numerous and spread out over a large geographic area.

According to one embodiment, a cloud-based management server is used to store a set of ACRs for a large number of distinct NCDs, also referred to as networked computing devices, in a central location. It further provides an efficient mechanism for synchronizing the ACRs and/or ACPs between the central location and a large number of NADs which will be providing network connectivity and enforcing the access control rules for those NCDs. In one embodiment, each ACR specifies one or more ACPs, and optionally an expiration time, for a specific NCD (identified by hardware media access control or MAC address for example). An ACP can include a number of access parameters, including bandwidth limits and traffic shaping rules, virtual LAN (VLAN) assignment, firewall rules, whether a captive portal should be applied to that device, etc.

According to one embodiment, the ACRs are stored centrally as a time-ordered log of additions and deletions of individual ACRs. Each ACR log entry includes a numerical version that increases over time. NADs periodically query the central management server by sending the version of the last log entry that the NAD received, and the central management server replies with any additional log entries that have been recorded since then. In this way, each network access device is kept up-to-date with the latest ACRs in an efficient manner. A software process runs periodically on the central management server to perform a house-keeping process on the log. In one embodiment, the process re-inserts any old (based on a configurable time period) unexpired ACR entries into the front of the log. This ensures that the full set of all active ACRs is contained in the recent portion of the log, and older portions can be periodically discarded.

Figure 1:
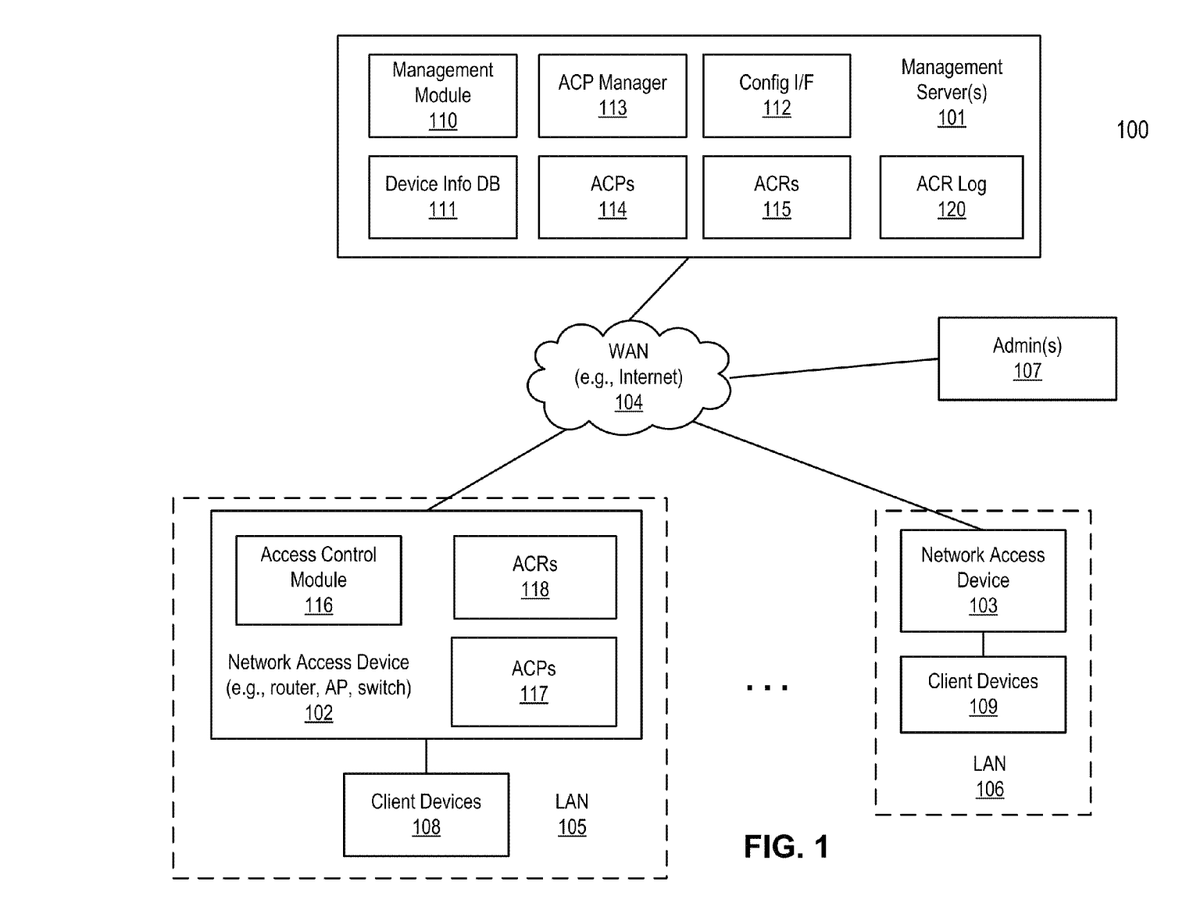
FIG. 1 is a block diagram illustrating a cloud managed network system according to one embodiment of the invention.

FIG. 1 is a block diagram illustrating a cloud managed network system according to one embodiment of the invention. Referring to FIG. 1, system 100 includes, but is not limited to, various network access devices (NADs) 102-103 (which may be wired and/or wireless) managed by a management server (MS) 101 over WAN 104. Management server 101 may be a Web or cloud server, or a cluster of servers, running on server hardware. Each of network access devices 102-103 is associated with a LAN such as LANs 105-106. Network 104 may be the Internet. Network access devices 102-103 may operate as a gateway device, an access point (AP), a network switch, or a combination thereof to LANs 105-106, respectively, where various client devices 108-109 can be communicatively coupled to LANs 105-106. According to one embodiment, a network access device may be a gateway device interfacing a LAN to WAN 104 and performs network address translation (NAT) for its clients, which may be network client devices 108-109 or other network access devices. A network client device may be any kind of networked computing devices, such as laptops, desktops, tablets, mobile phones, personal digital assistants (PDAs), media players, gaming devices, etc.

Referring to FIG. 1, in this example, it is assumed that network access devices 102-103 are owned by the same organization and administrated by a network administrator 107 associated with the organization. Also note that for the purpose of illustration, although network access device 103 is not shown with details therein, network access device 103 has the same or similar architecture as network access device 102. For the purpose of illustration, only two network access devices are shown, but additional network access devices may be coupled to network 104 and managed by management server 101. Also note that management server 101 may manage network access devices for multiple organizations managed by different administrators. For example, network access device 102 may be associated with a first enterprise that is separate from a second enterprise associated with network access device 103.

According to one embodiment, management server 101 includes a management module 110 for managing network access devices 102-103. In one embodiment, each of network access devices 102-103 maintains a persistent tunnel (e.g., a secure communications channel) with management server 101 for exchanging network management messages (also referred to as an mTunnel). When a network access device such as NAD 102 boots up, NAD 102 connects and logs onto management server 101 and management server 101 authenticates NAD 102. The hardware identifier such as a serial number of NAD 102 is stored in NAD information database 111. In addition, NAD 102 may also be assigned with a network identifier for the purpose of logically grouping NAD 102 with some other NADs such as NAD 103. Thus, multiple NADs may be associated with the same network identifier. Management server 101 further includes a configuration interface 112, such as a Web interface, to allow administrator 107 to log into management server 101 to enter configuration information for configuring NADs 102-103. For example, administrator 107 may specify minimum configuration parameters and management module 110 of management server 101 automatically compiles other related configuration information without requiring the administrator 107 to enter the detailed configuration information.

According to one embodiment, management server 101 includes an access control policy (ACP) manager 113 to manage ACPs 114 and access control rules (ACRs) 115, which may be configured by administrator 107 via configuration interface 112. ACPs 114 and ACRs 115 are used to control access of client devices 108-109. ACPs 114 refer to a set of predefined policies and ACRs 115 refer to a set of rules specifying how ACPs 114 should be applied. An ACR may itself be an ACP. ACPs 14 and ACRs 115 may be implemented as a single entity. According to one embodiment, ACP manager transmits ACPs 114 and ACRs 115 to each of network access devices 102-103 over the Internet and the transmitted ACPs and ACRs are stored in the network access devices 102-103, for example, as ACPs 117 and ACRs 118, and managed by an access control module (ACM) such as ACM 116.

For example, when network access device 102 boots and connects to management server 101, management server 101 authenticates network access device 102. An mTunnel is created between management server 101 and network access device 102. ACPs 114 and ACRs 115 are then downloaded from management server 101 to network access device 102 via the mTunnel and stored in network access device 102 as ACPs 117 and ACRs 118. When a client device such as client device 108 is associated with network access device 102, access control module 116 controls the access of client device 108 by enforcing ACPs 117 and ACPs 118.

If there is any update concerning ACPs 117 and/or ACRs 118, access control module 116 transmits the update to management server 101. In response, management server 101 broadcasts the update to other remaining network access devices associated with the same organization, such as network access device 103. For example, when client device 108 connects with network access device 102 requesting entering LAN 105 in order to access the Internet 104, network access device 102 may examine the corresponding ACRs and/or ACPs to control the access of client device 108. In some situations, the ACRs/ACPs associated with client device 108 may indicate that the authentication of client device 108 may be performed via a remote captive portal. As result, network access device 102 may redirect the request to the captive portal for authentication. Upon receiving a successful authentication signal, network access device 102 may update ACPs 117 and/or ACPs 118 to include information indicating that client device 108 has been successfully authenticated. Such an update is then transmitted (e.g., pushed by network access device 102 or polled by management server 101) to management server 101 and management server 101 broadcasts the update to remaining network access devices such as network access device 103. As a result, both network access devices 102-103 have the same set of ACPs and ACRs.

According to another embodiment, NADs 102-103 do not need to push ACRs up to management server 101; rather, management server 101 pushes down the ACRs to NADs 102-103. In one embodiment, a remote captive portal is implemented with the MS 101. So when a NAD device has authenticated with the captive portal, the captive portal component notifies the NAD immediately (so that the NAD can let the device online), and it simply updates the ACRs in the MS directly, at which point the ACRs are transmitted to all the other NADs.

Subsequently, referring back to FIG. 1, when client device 108 roams from network access device 102 to network access device 103, network access device 103 can use the same ACPs/ACRs to control the access of client device 108. In this example, since the updated ACRs/ACPs stored within network access device 103 include information indicating that client device 108 has been previously authenticated (e.g., via network access device 102), network access device 103 does not need to redirect the request to a remote captive portal for authentication again.

According to one embodiment, each of the ACRs 115 specifies one or more access policies or links to one or more of ACPs 114 for a specific network client device (for example, identified by its hardware MAC address) and an optional expiration time. As mentioned above, an access policy can include a number of parameters including bandwidth limits and traffic shaping rules, VLAN assignment, firewall rules, whether a captive portal should be applied to that device, etc. When storing an ACR, the specific rules of the policy can either be explicitly stated in the ACR, or the ACR can refer to the identifying number of a pre-defined ACP 115 that is already stored elsewhere in the system, as shown in FIG. 2.

In one embodiment, an example ACR that explicitly specifies an ACP can be defined as follows:
MAC address: 00:11:22:33:44:55
Expiration: Apr 20 2012 23:20:42
Policy:
  Download Bandwidth: 2 Mbps
  Upload Bandwidth: 1 Mbps
  VLAN ID: 100
  Firewall: block TCP port 80

An example ACR that refers to a pre-defined ACP may be defined as follows:
MAC address: 00:11:22:33:44:55
Expiration: (Never expires)
Policy: policy_id 105

Figure 2:
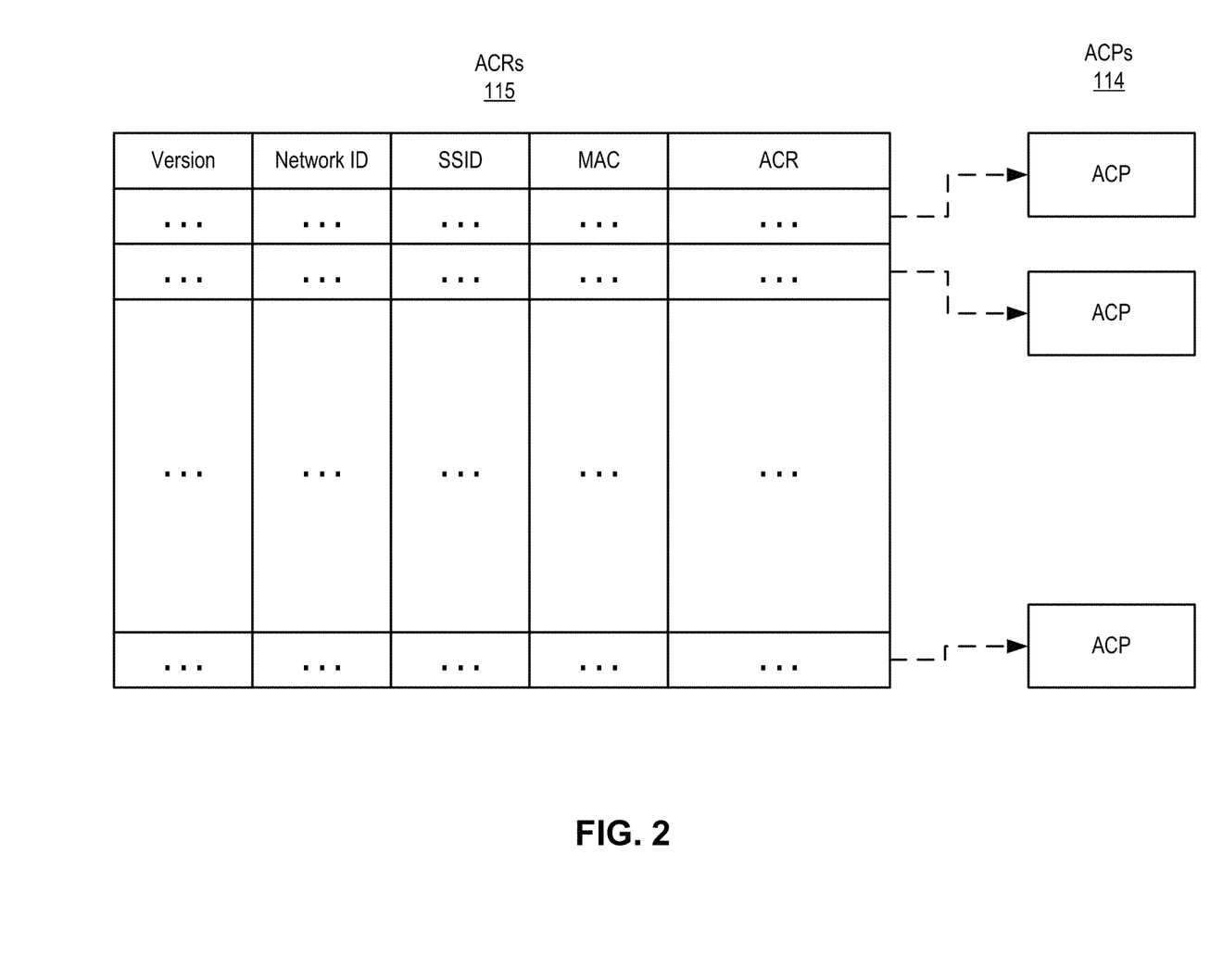
FIG. 2 is a block diagram illustrating a data structure representing access control rules and access control policies according to one embodiment of the invention.

Referring to FIG. 2, as an example, an ACR is associated with a version number identifying a version of the ACR. An ACR may be configured based on a network identifier of a network access device. Alternatively, an ACR may be configured based on a network identifier of one or more network access devices, rather than applying only to a specific client device. For example, a network access device may be associated with a network segment (e.g., a particular department such as finance department of a corporation) that only people in certain roles can access. Under such a circumstance, a single ACR/ACP may be utilized to control access of any client devices currently associated with that particular network access device. According to another embodiment, wireless client devices associated with different SSIDs may be assigned with different ACRs/ACPs. For example, all client devices associated with network access devices with the same network identifier may have applied with the same default ACR/ACP. Within the common ACR, there may be some rules which are exceptions for different SSIDs that may override the default rules. An enterprise company may have multiple network identifiers and a network identifier may be associated with multiple SSIDs. Other configurations may also be implemented.

Figure 3:
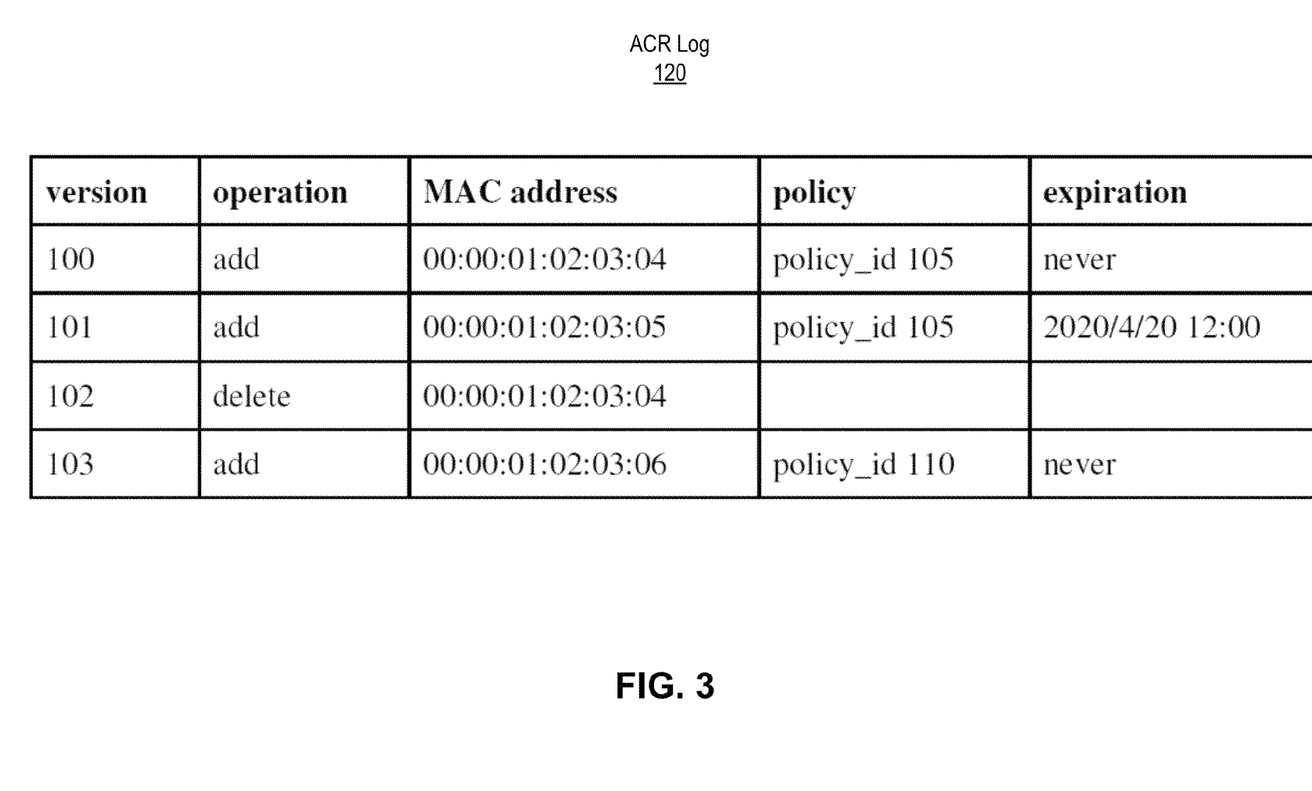
FIG. 3 is a block diagram illustrating a data structure representing an access control rule log according to one embodiment of the invention.

Referring back to FIG. 1, according to one embodiment, management server 101 maintains a data structure, such as, for example, an ACR log 120, to keep track of updates or changes of ACRs 114 and/or ACPs 115. The ACRs are stored centrally as a time-ordered log of additions and deletions of individual ACRs. Each ACR log entry includes a numerical version that increases over time. A convenient implementation of the version is to use a timestamp when that log entry was added, however any numerical value that is strictly increasing over time will suffice. An example of an ACR log 120 is shown in FIG. 3. Referring to FIG. 3, device 00:00:01:02:03:05 is assigned to policy_id 105, and 00:00:01:02:03:06 is assigned to policy_id 110; device 00:00:01:02:03:04 had a policy added and then removed, so its policy is no longer active.

Management server 101 keeps NADs 102-103 up-to-date by periodically sending any ACRs that have been recorded in the log since the last update they received. In one embodiment, NADs 102-103 periodically query management server 101, sending the version of the log entry that they last received. Management server 101 replies by sending any ACR entries from the log that were inserted after the version the NAD reports having. In another embodiment, management server 101 periodically queries each of the NADs 102-103. The NAD replies with the version number of the last log entry it received, and management server 101 then replies with any additional new entries that it has recorded.

If a new NAD is added to the system, it will initially report a version of zero since it has no ACRs yet, and management server 101 will need to reply with all of the current ACRs. In order to keep this lookup efficient and in order to keep the log from growing without bound, according to one embodiment, a software process runs periodically on management server 101 and re-inserts or copies any old (based on a configurable time period) unexpired ACR entries into the front of the log, and then deletes all old entries. This house-keeping (i.e., garbage collection) process ensures that the full set of all active ACRs is contained in the recent portion of the log, and that the size of the log does not grow without bound.

Note that a variety of garbage collection methods can be utilized herein for such purposes, such as, for example, a mark-and-sweep method. A mark-and-sweep garbage collector maintains a bit (or two) with each object (e.g., an ACR entry) to record whether it is white or black (e.g., invalid or valid, where a deleted ACR is an invalid entry); the grey set is either maintained as a separate list (such as the process stack) or using another bit. As the reference tree is traversed during a collection cycle (the "mark" phase), these bits are manipulated by the collector to reflect the current state. A final "sweep" of the memory areas then frees white objects (e.g., invalid entries), for example, by moving or copying the valid entries with old timestamps (e.g., old versions) to the top of the queue or buffer, with new timestamps.

According to another embodiment, the entire log is played forward once to build the final ACR state as of the current time. To accomplish that, ACR entries are added or removed based on the records in the log, and any ACR whose expiration date is now in the past is skipped entirely. This provides a set of ACR entries that are still valid (have neither expired nor been explicitly deleted/removed), referred to as the Current Valid Rules (CVR). The oldest portion of the log (e.g. the oldest one day's worth of entries, or however much one wants to clean) is played forward again. Any ACR entry that is in the CVR set is re-inserted at the front of the log. The oldest portion of the log (whichever portion reinserted) can now be discarded. This has the effect of implicitly deleting any entries at the back of the log that were no longer valid; we did not re-insert them, and then we deleted all entries. Note that it is not necessary to communicate any of this to the NADs, because they already have all the relevant information: ACRs that have expired will already be dropped by the NADs, and ACRs that were explicitly deleted will already be deleted on the NADs too. This just prevents us from broadcasting stale ACRs to new NADs that join the network, and keeps the size of the log manageable.

Such a garbage collection process may be performed by the management server and the management server broadcasts the updated ACRs to the network access devices with a newer version. Alternatively, such a garbage process may be performed by the network access devices, in which each of the network access devices maintains an ACR log. For example, the management server may send a command, via a respective persistent mTunnel using a variety of tunneling protocols (e.g., UDP/IP or UDP/HTTP), to network access devices indicating which of the entries are not invalid (e.g., deleted) to allow the network access devices to remove the invalid entry or entries from its ACR log.

According to some embodiments, ACRs that apply to multiple NCDs can be implemented by allowing wildcards or ranges of values in the MAC address field (e.g., a prefix portion of the MAC) of the ACRs. Multiple layers of policies are possible by including a "priority" for each ACR entry (e.g., a specific rule or exception overriding a default or base rule). This would allow an administrator to specify a default policy for all devices, for example, and to override that default policy (e.g., policy associated with a particular network identifier) with a different policy for specific devices (e.g., specific policies for different SSIDs), by allowing the highest priority policy to take precedence. In a system where multiple logical networks are hosted on the same management server, a single ACR log can be used for the whole system by adding appropriate identifier fields to the log. For example, a management server might handle functionality for multiple separate networks with separate rules, in which case a network identifier field could be added to the ACR log format. Similarly, a wireless network might have different SSIDs which act as different virtual networks with separate access control policies, in which case an SSID identifier field could be added. To improve transmission efficiency of sending ACRs to devices, according to one embodiment, a compact binary format such as Google Protocol Buffers or Apache Thrift can be used to send the updates. To increase overall system efficiency, NADs can periodically store the current ACR state to local persistent storage. This will make it so that if their runtime state is lost (e.g. if the device loses power and reboots), they will not need to re-fetch the entire list of ACRs from the central server. Instead, they can recover the last known ACR state from its local storage after reboot, particularly, if the last known ACRs were updated within a predetermined period of time (e.g., still fresh or valid). In addition to an administrator configuring ACRs and ACPs, according to some embodiments, ACRs can be added automatically by software, e.g. in the case where a user authenticates themselves via captive portal; in this case an ACR will be added for that user's NCD without direct administrator intervention.

Figure 4:
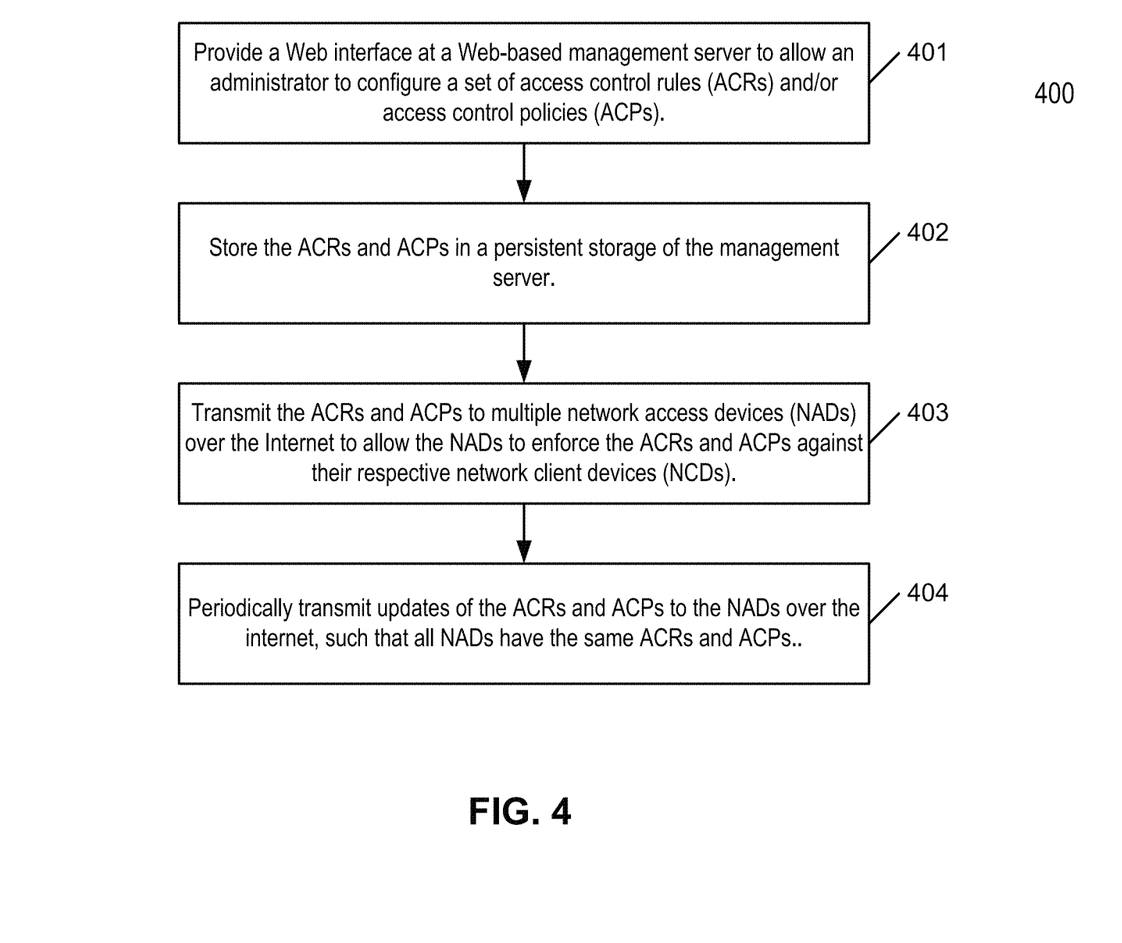
FIG. 4 is a flow diagram illustrating a method for managing access control rules and policies according to one embodiment of the invention.

FIG. 4 is a flow diagram illustrating a method for managing access control rules and policies according to one embodiment of the invention. Method 400 may be performed by management server 101 of FIG. 1, where the method may be performed by processing logic that may include software, hardware, or a combination thereof. Referring to FIG. 4, at block 401, a Web interface is provided at a management server to allow an administrator to configure a set of ACRs and/or ACPs for client devices. At block 402, the ACRs and ACPs are then stored in a persistent storage of the management server. At block 403, the ACRs and ACPs are transmitted from the management server to multiple network access devices that are associated with the same enterprise company. The network access devices enforce the ACRs and ACPs to control access of the associated network client devices. At block 404, the management server periodically transmits updates of the ACRs and ACPs to the network access devices over the Internet.

Figure 5:
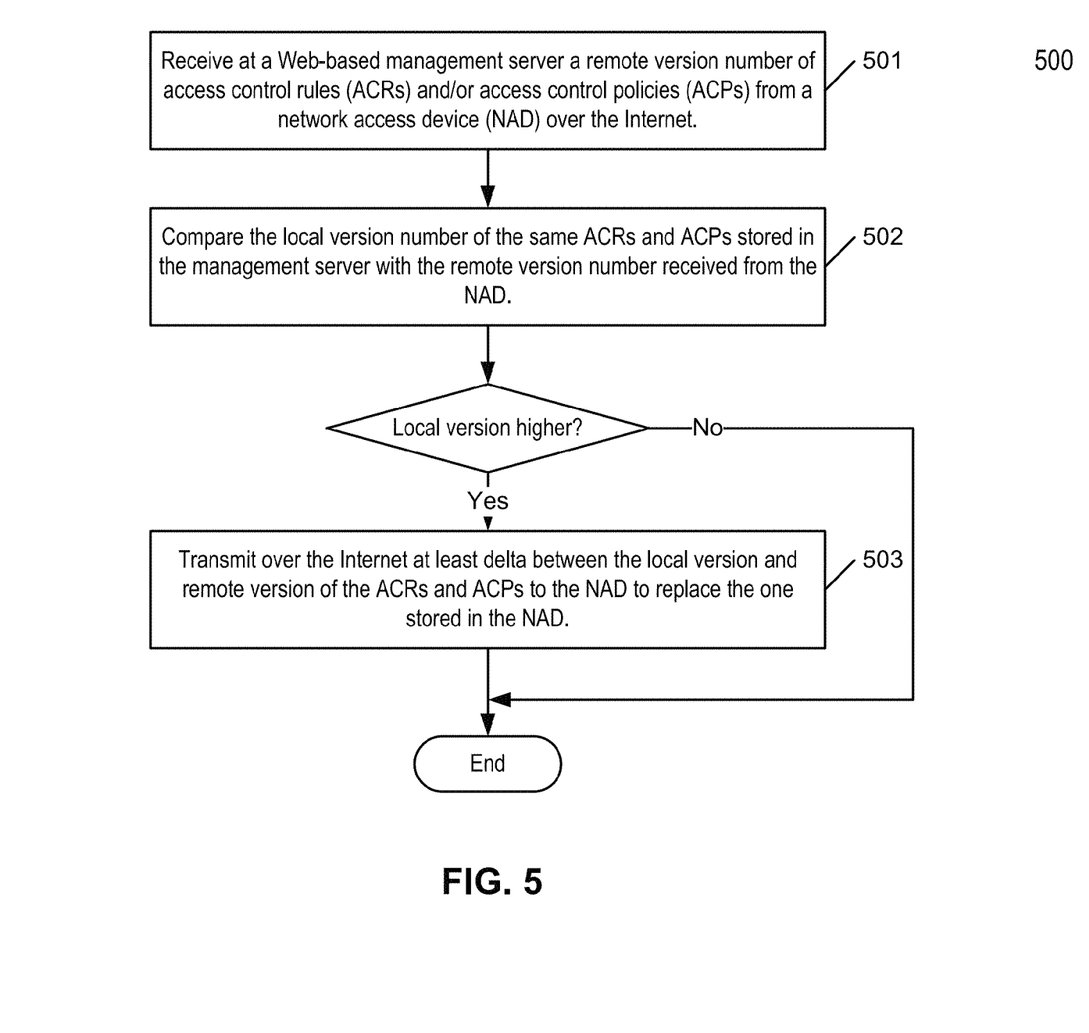
FIG. 5 is a flow diagram illustrating a method for managing access control rules and policies according to another embodiment of the invention.

FIG. 5 is a flow diagram illustrating a method for managing access control rules and policies according to another embodiment of the invention. Method 500 may be performed by management server 101 of FIG. 1, where the method may be performed by processing logic that may include software, hardware, or a combination thereof. Referring to FIG. 5, at block 501, a remote version number of ACRs and/or ACPs is received by a management server via its Web interface from a network access device over the Internet. At block 502, a local version number of the ACRs and/or ACPs is compared with the remote version number. If the local version number is greater than the remote version number, at block 503, at least delta difference between two versions of the ACRs and/or ACPs is transmitted to the network access device replacing the existing version therein.

Figure 6:
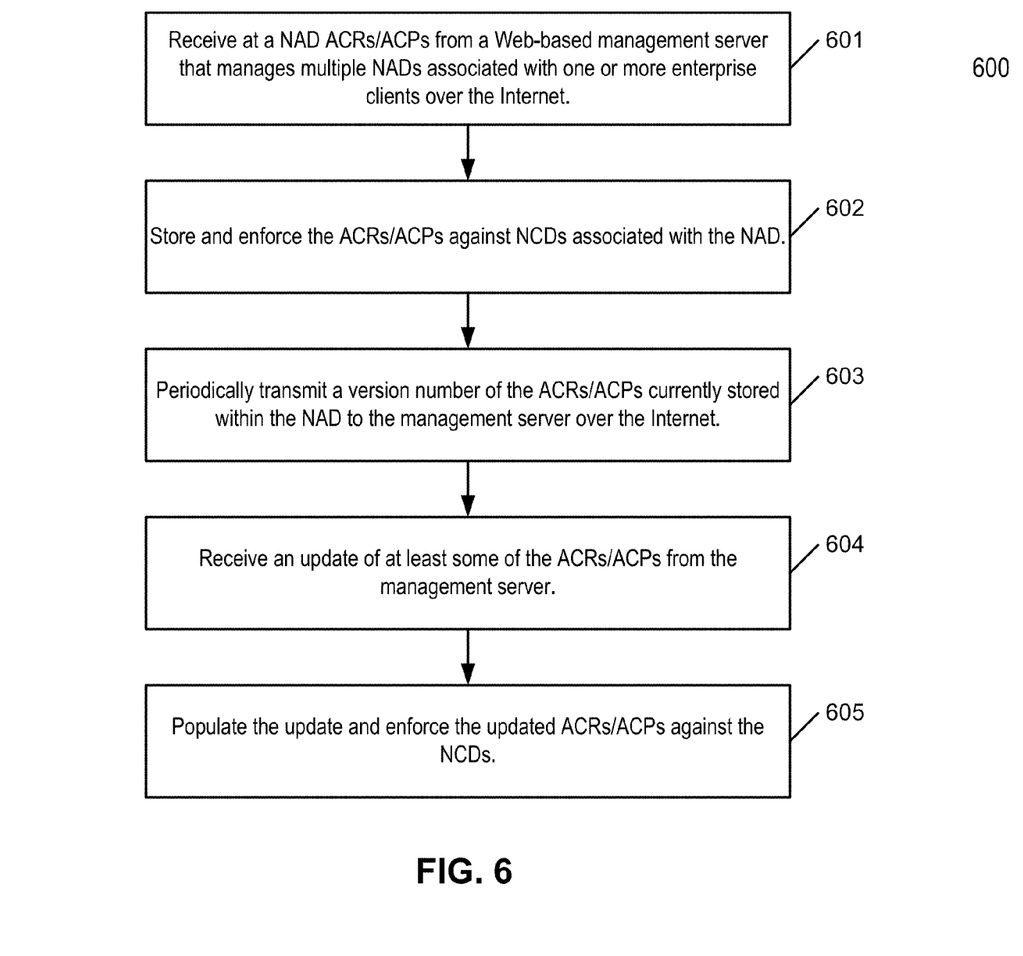
FIG. 6 is a flow diagram illustrating a method for managing access control rules and policies according to another embodiment of the invention.

FIG. 6 is a flow diagram illustrating a method for managing access control rules and policies according to another embodiment of the invention. Method 600 may be performed by a network access device such as network access devices 102-103 of FIG. 1, where the method may be performed by processing logic that may include software, hardware, or a combination thereof. Referring to FIG. 6, at block 601, a NAD receives ACRs/ACPs from a management server over the Internet, where the management server manages multiple network access devices associated with one or more enterprises. At block 602, the ACRs/ACPs are then stored and enforced by the network access device against its network client devices. At block 603, the NAD periodically transmits a version number to the management server representing the current version of the ACRs/ACPs currently stored within the network access device. At block 604, an update of the ACRs/ACPs is received from the management server and the update is populated within the network access device at block 605.

Figure 7A:
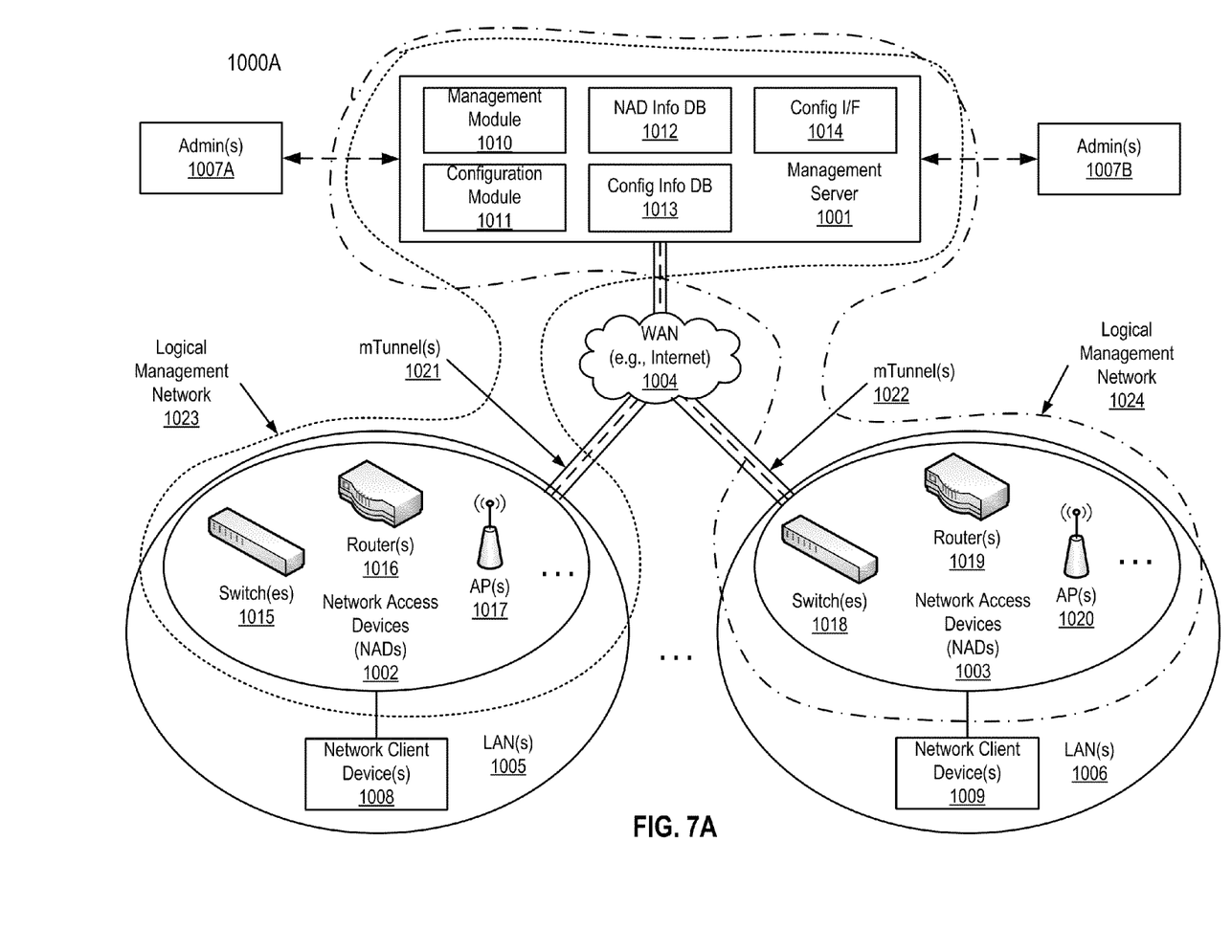
FIGS. 7A and 7B are block diagrams illustrating a cloud managed network configuration according to certain embodiments of the invention.

FIG. 7A is a block diagram illustrating a cloud managed network system according to one embodiment of the invention. System 1000A may be implemented as part of any of the network systems described above, such as system 100 of FIG. 1. Referring to FIG. 7A, system 1000A includes, but is not limited to, various network access devices (NADs) 1002-1003 managed by a management server 1001 over WAN 1004. Management server 1001 may be a Web or cloud server, or a cluster of servers, running on server hardware. Each of network access devices 1002-1003 may be associated with a LAN such as LANs 1005-1006. A LAN herein may also refer to a sub-network or network segment (e.g., subnet or a virtual LAN (VLAN)) of a larger LAN (e.g., Intranet). Network 1004 may be the Internet. Any of network access devices 1002-1003 may operate as a gateway device (e.g., routers 1016 and 1019), an access point (AP) (e.g., APs 1017 and 1020), a network switch (e.g., switches 1015 and 1018), or a combination thereof to LANs 105-106, wired or wireless, where various network client devices (NCDs) 1008-1009 can be communicatively coupled to LANs 105-106.

According to one embodiment, a network access device may represent a gateway device interfacing a LAN to WAN 1004 and performs network address translation (NAT) for its clients, which may be client devices 1008-1009 or other network access devices. A network access device may be configured behind another network access device. For example, an uplink of an access point may be coupled to a downlink of a gateway device. Alternatively, an uplink of a network switch may be coupled to a downlink of a gateway device or an access point, etc. A network access device may be an integrated device integrating two or more of these functionalities (e.g., router/gateway, access point, and/or network switch), wired and/or wireless.

Referring back to FIG. 7A, in one embodiment, management server 1001 works for both single and multi-tenant installations, meaning that multiple organizations with different network administrators may have network access devices managed by the same management server, and network configuration or management can be performed using the same management server, but are firewalled off from each other and do not have access to each other's network configurations. In this example, network access devices 1002 and network access devices 1003 may be associated with or owned by the different organizations and administrated by different network administrators 1007A and 1007B associated with the organizations. Some of network access devices 1002 may communicate with each other to form a local mesh network, while some of network access devices 1003 may communicate with each other to form another local mesh network.

According to one embodiment, management server 1001 includes a management module 1010 and a configuration module 1011 to manage and to configure network access devices 1002-1003 and to generate management server configuration information for each of network access devices 1002-1003, which may be stored in configuration information database 1013. In one embodiment, management server 1001 provides a user interface 1014 such as a Web interface to allow a network administrator such as administrators 1007A and 1007B to create and log into an account associated with an organization to which the network access devices 1002 or network access devices 1003 belong.

The management server 1001 further includes a NAD information database 1012, including information regarding the network access devices 1002-1003. In one embodiment, the NAD information database 1012 includes a serial number and a mechanism to authenticate the network access device's identity (e.g., the public key of a private public key pair, the private key of which was embedded or stored in the network access device during the manufacturing). NAD information database 1012 may be populated different ways in different embodiments (e.g., populated by the seller of the network access devices, populated by the network administrator). In embodiments in which this information is populated by the seller, different embodiments may associate the information regarding network access devices 1002-1003 in the router information database with the user account in different ways (example, network administrators 1007A and 1007B may provide an order number (or invoice number) associated with a purchase of network access devices 1002 or 1003).

According to one embodiment, when a network access device is powered up and attempts entering network 1004, the network access device attempts to contact management server 1001. In one embodiment, certain device information such as an IP address and domain name service (DNS) name of management server 1001 is stored in the network access device when it is manufactured. In one embodiment, when the network access device is powered up, the network access device performs any self configuration processes including obtaining an IP address for itself from a dynamic host configuration protocol (DHCP) facility (which address may be a public IP address, or may be a private IP address if there is a device performing NAT between the router and the WAN (that is to say, the network access device is behind a device performing NAT)). The network access device then accesses management server 1001 based on the server's IP address and authenticates itself (e.g., signing a message (e.g., including the serial number of the network access device) using a private key associated (and/or stored) with the network access device, such that management server 1001 can authenticate the network access device using the associated public key (stored in NAD information database 1012) maintained by management server 1001).

In one embodiment, each of network access devices 102-103 creates one or more secure communication channels (e.g., a control tunnel) with server 1001 using the keys downloaded from management server 101 to exchange control traffic such as management messages or notification, operating status of the network access device, etc. Such a tunnel for network management purposes is referred to herein as an mTunnel. In this example, network access devices 1002 maintain at least one mTunnel 1021 with management server 1001 and network access devices 1003 maintain at least one mTunnel 1022 with management server 1001. In one embodiment, each of network access devices 1002 may maintain a persistent mTunnel with management server 1001. Alternatively, only the network access device operating as a gateway device maintains an mTunnel with management server 1001, while other network access devices behind the gateway device communicate with the gateway device to share the same mTunnel. Typically, a network access device operating as a gateway performs network address translation (NAT) for its clients, which may be a network client device or another network access device.

In one embodiment, once a network access device has been successfully authenticated by server 1001, the network access device downloads configuration information and stores it in a storage device within the network access device. This download may take place over a secure session layer (SSL)-encrypted session and/or the management server may encrypt the data using the public key corresponding to the private key. This secure channel may also be used to receive subsequent configuration updates from management server 1001. According to one embodiment, subsequently, when there is a change in the configuration, such as adding or removing a network access device, changing of subnet settings (for example, by an administrator such as administrators 1007A and 1007B via a Web interface of management server 1001), management server 1001 generates updated configuration information and communicates the updates to the network access devices via their corresponding mTunnels (such communication can be done with different mechanisms depending on the embodiment of type of information, including a push mechanism, a pull mechanism, etc.).

A variety of tunneling protocols can be utilized over an mTunnel between a network access device and management server 1001, such as, for example, Internet protocol (IP) over user datagram protocol (UDP) (IP/UDP) encapsulation. For example, a network management message may be carried as an IP packet and the IP packet may be encapsulated within a UDP packet exchanged between a network access device and management server 1001 over a respective mTunnel. In one embodiment, an IP packet having one or more network management messages embedded therein may be wrapped with a predetermined mTunnel header and is transmitted within a UDP packet between management server 1001 and a network access device, even if the network access device is behind a NAT device.

In some configurations, if a network access device is behind a firewall that does not allow any UDP packet going through, a UDP packet carrying a network management message may be encapsulated within a hypertext transport protocol (HTTP), referred to herein as UDP over HTTP (UDP/HTTP). Since most of the firewalls allow Internet traffic using HTTP protocol with a transport control protocol (TCP) port of 80, it is likely a UDP packet embedded within an HTTP packet having a destination TCP port of 80 can reach management server 1001. In such a configuration, when management server 1001 receives the HTTP packet, it may remove any HTTP header to reveal a UDP packet encapsulated therein. Thereafter, an IP packet encapsulated within the UDP packet may be extracted and the network management message within the IP packet can be obtained.

According to one embodiment, management server 1001 and network access devices associated with an organization such as network access devices 1002 may utilize a private or internal set of IP addresses to exchange network management messages via the respective mTunnel or mTunnels. That is, the private IP addresses used by management server 1001 and network access devices 1002 via the respective mTunnel or mTunnels may be in a separate IP address space (e.g., 6.x.x.x) that is different from an IP address space used between network access devices 1002 and their network client devices 1008 over LAN(s) 1005 (e.g., 10.x.x.x). That is, the private IP addresses described herein are only used between management server 1001 and network access devices 1002 to exchange network management messages over the respective mTunnel(s). In this example, management server 1001 and network access devices 1002 using private IP addresses to exchange network management messages over mTunnel(s) 1021 forms a logical network 1023 (e.g., a logical management network).

Similarly, management server 1001 and network access devices 1003 of another organization in this example may utilize a different set of private or internal IP addresses to exchange network management messages through the respective mTunnel or mTunnels, where the private IP addresses may be in a different IP address space than the one of IP addresses used between network access devices 1003 and their client devices 1009. Similarly, in this example, management server 1001 and network access devices 1003 using private IP addresses to exchange network management messages over mTunnel(s) 1022 forms a logical network 1024 (e.g., a logical management network). The private IP addresses (referred to herein as a first set of private IP addresses) used between management server 1001 and network access devices 1002 may be different than the private IP addresses (referred to herein as a second set of private IP addresses) used between management server 1001 and network access devices 1003. The first and second sets of private IP addresses may be in different IP address spaces or in the same IP address space dependent upon the specific configuration.

According to one embodiment, when a network access device is powered up and initialized, the network access device performs certain self-configuration operations to determine whether the network access device should operate as a gateway or as an access point behind a gateway. In one embodiment, when a network access device boots up, it initializes its Ethernet interface and attempts to request an IP address (e.g., a publicly accessible IP address over the Internet, also referred to as an uplink IP address) by broadcasting its media access control (MAC) address within a dynamic host configuration protocol (DHCP) request via its Ethernet interface. If the Ethernet interface of this network access device is connected to the Internet, a DHCP server, which may be a separate server or part of management server 1001, will respond with a valid IP address assignment, and the network access device will operate as a gateway device. If there is no DHCP response received within a predetermined period of time, the network access device assumes that it is operating behind another gateway device that performs NAT, and the network access device then joins an existing network and operates as an access point.

According to one embodiment, when operating behind a gateway, each of the network access devices derives its own IP address and assigns IP addresses to its client devices using a predetermined method in a consistent manner. In one embodiment, a network access device performs a hash operation on at least a portion of its hardware identifier such as a MAC address to generate an IP address. In a particular embodiment, a network access device hashes its 6-byte MAC address using a predetermined hash function (e.g., CRC-32 hash function) to generate lower three bytes of its IP address. Note that each of the network access devices may generate two IP addresses for itself: 1) an IP address in a first IP address space (e.g., 6.x.x.x) solely for communicating network management messages with management server 1001 via an mTunnel; and 2) an IP address in a second IP address space (e.g., 10.x.x.x) for normal network traffic with its client devices.

Similarly, when a network client device, such as client devices 1008, requests an IP address, the associated network access device hashes a MAC address of the client device to derive an IP address for the client device. Since each of the network access devices performs the same hash operation using the same hash function on a MAC address of a client device, the client device can consistently obtain the same IP address from different network access devices. As result, the client device can roam across different network access devices without having to change its IP address or to perform any address resolution protocol (ARP) related operations.

Figure 7B:
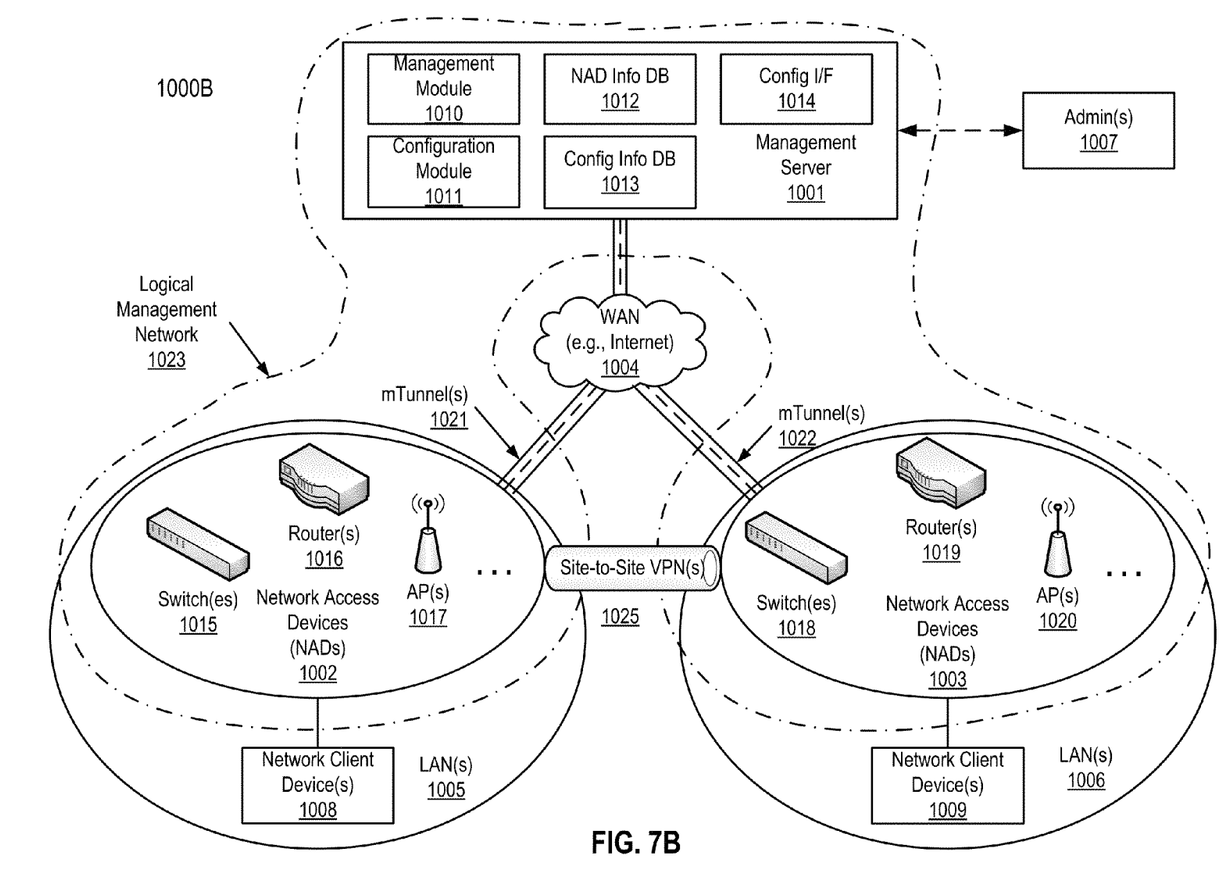

Referring back to FIG. 7A, as described above, network access devices 1002 and network access devices 1003 are associated with different organizations and managed by management server 1001. In other configurations, network access devices 1002 and network access devices 1003 may be associated with the same organization as shown as system 1000B in FIG. 7B. Referring to FIG. 7B, in this configurations, network access devices 1002 and network access devices 1003 may be deployed and located at different sites or geographical locations of the organization. According to one embodiment, at least one virtual private network (VPN) tunnel 1025 is maintained between at least one of network access devices 1002 and at least one of network access devices 1003, also referred to as a site-to-site VPN. Some or all of the network access devices can be configured, via configuration interface 1014, to participate in the site-to-site VPN.

Figure 8:
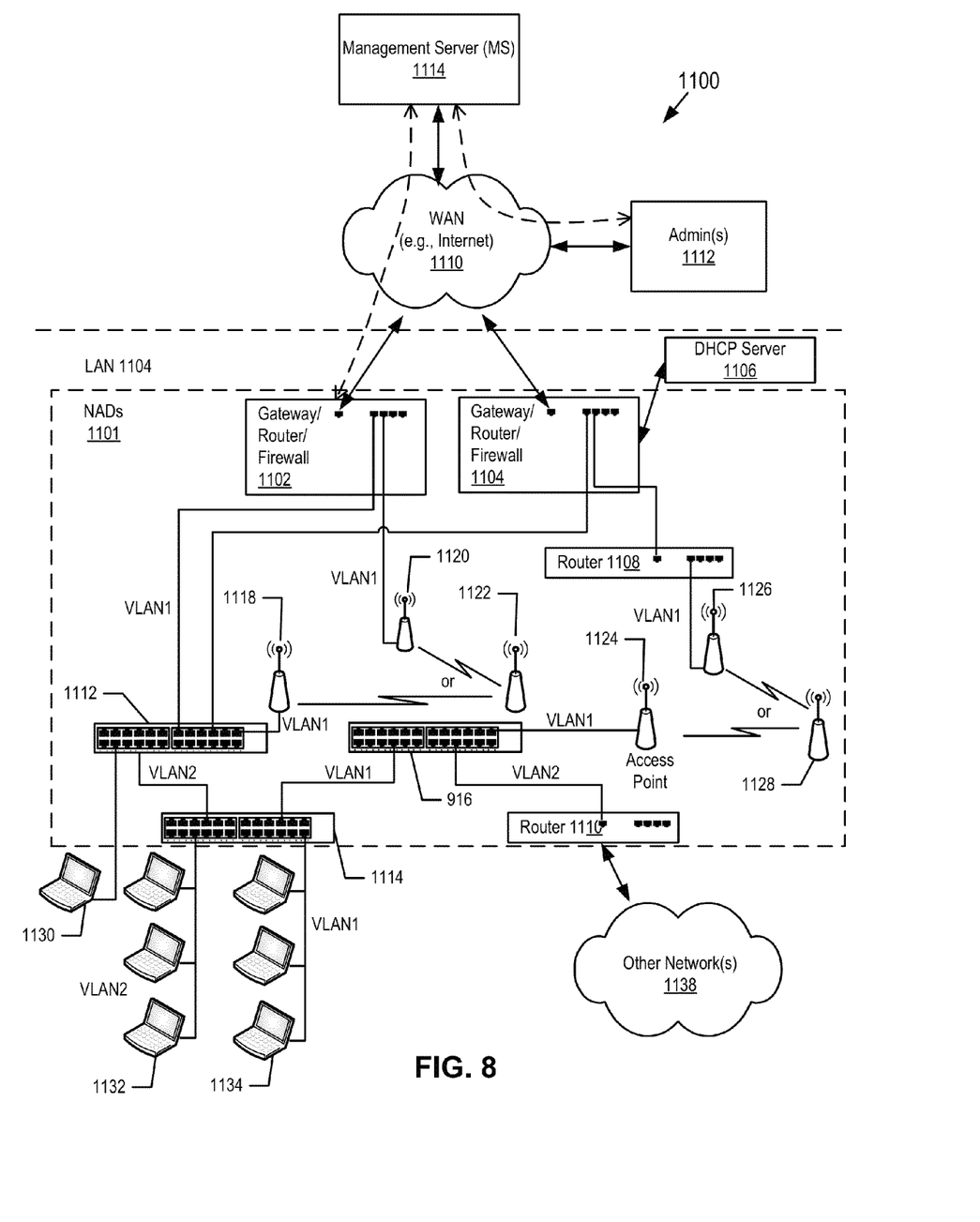
FIG. 8 is a block diagram illustrating a network configuration in accordance with another embodiment of the invention.

FIG. 8 is a block diagram illustrating a network configuration in accordance with an embodiment of the invention. Network configuration 1100 may be implemented as part of network configurations as shown in FIGS. 7A and 7B. The configuration of NADs 1101 represents one possible implementation of one of the LANs 1005 and 1006 of FIGS. 7A-7B, such as the one including an access network, where one or more of the NADs 1101 are in accordance with embodiments of the present invention. That is, any of the routers (e.g., 1102, 1104, 1108 and 1110), network switches (e.g., 1112-1114), and wireless access points (e.g., 1118-1128) shown in FIG. 8 may be implemented by way of the previously described network access devices, including NADs 1002 and 1003 of FIGS. 7A-7B. FIG. 8 illustrates the complexity and variety of possible configurations that may need to be accounted for by a system administrator (e.g., admin 1112) when configuring a network access device within LAN 1104. For example, LAN 1104 includes multiple gateways to WAN 1110, multiple VLANs, and multiple possible paths to WAN 1110 by many of the NADs 1101. A change in one of the NADs 1101 may require complex configuration changes to one or more of the downstream NADs. To be sure, a configuration change or fault in wireless access point 1120 may result in required configuration changes to wireless access points 1122 and 1118, and network switches 1112 and 1114. Similarly, a configuration change or fault in router 1108 may result in required configuration changes to wireless access points 1126, 1128, and 1124, network switches 1116 and 1114, and router 1110. As is apparent, manual configuration of the network access devices in a network such as LAN 1104 can be complex and extremely error prone. Furthermore, changes to LAN 1104 resulting in a loss of network connectivity may be difficult to diagnose and troubleshoot. Accordingly, embodiments of the present disclosure allow for an installer to install one or more of NADs 1101 by simply powering on the device and connecting a cable. Then, the NAD may automatically establish a connection to WAN 1110, such that Administrator 1112 may remotely configure NAD 1102 by way of management server 1114. Furthermore, NADs 1101 may be configured to periodically test their connection to WAN 1110 and if it is lost, to automatically establish a new connection to WAN 1110, so as to reduce down time of LAN 1104.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A system for managing access control policies, comprising:
   a management server, residing on server hardware communicatively coupled to a plurality of network access devices (NADs) over the Internet, the management server including:
      a Web interface to allow an administrator to login and configure access control policies (ACPs) of network client devices (NCDs),
      a database to store the ACPs and a set of access control rules (ACRs) received from the Web interface, the ACRs defining one or more rules to apply the ACPs, and
      an ACP manager to manage the ACRs and the ACPs, wherein the ACP manager is to transmit over the Internet the ACPs and the ACRs to the plurality of NADs to allow the plurality of NADs to apply the ACPs to their respective network client devices based on the ACRs; and
   the plurality of NADs, each NAD of the plurality of the NADs comprising:
      an access control module to download the ACPs and the ACRs from the management server over the Internet to yield downloaded ACPs and downloaded ACRs, wherein the access control module is to periodically communicate with the ACP manager of the management server to exchange updates of the ACRs and ACPs between the each NAD and the management server, and
      a storage to store the downloaded ACPs and the downloaded ACRs, wherein the access control module is to enforce the downloaded ACPs against its respective network client devices based on the downloaded ACRs,
   wherein the plurality of NADs is associated with one or more network identifiers for logically grouping the plurality of NADs, wherein the ACRs are uniformly applied to one or more of the plurality of NADs that are associated with an identical network identifier,
   wherein the each NAD of the plurality of NADs operates as one of a gateway device, a network switch, or a wireless access point to allow a plurality of NCDs to access a respective local area network (LAN) and to access the Internet via the respective LAN, and
   wherein when an NCD of the plurality of NCDs connects to an NAD of the plurality of NADs and requests to enter a LAN associated with the NAD, the NAD authenticates the NCD and applies an ACR of the ACRs to the NCD, wherein the NAD further updates the ACR to indicate that the NCD has been authenticated successfully, wherein the NAD transmits information about the updated ACR to the management server over the Internet, and wherein the management server is to update the ACR stored therein and to broadcast the change of the ACR to remaining NADs of the plurality of NADs over the Internet to allow the remaining NADs to update the ACR stored therein.

2. The system of claim 1, wherein the NAD is a first NAD, and wherein when the NCD roams from the first NAD to a second NAD of the plurality of NADs, the second NAD applies the updated ACR that has been received from the management server, without having to authenticate the first NCD again.

3. The system of claim 1, wherein at least one of the ACRs includes a first rule to be applied to one or more NCDs associated with a first service set identifier (SSID) and a second rule to be applied to one or more NCDs associated with a second SSID, wherein the first rule and the second rule are different.

4. The system of claim 1, wherein the management server further maintains an ACR log for logging update activities of the ACRs, wherein the ACR log includes a plurality of log entries, each log entry corresponding to an update activity of a particular ACR, wherein the each log entry includes a version number representing a time when a corresponding update activity occurs.

5. The system of claim 1, wherein the each NAD is to periodically transmit a version number of each ACR to the management server, and wherein the management server is configured to
compare a local version number of the each ACR currently stored within the management server with the version number received from the each NAD, and
transmit a newer version of the each ACR to the each NAD if the local version number is higher than the received version number.

6. The system of claim 4, wherein the management server is to periodically scan the ACR log to identify an update activity that causes an ACR invalid and to remove identified ACR and its log entry from the ACR log.

7. The system of claim 1, wherein the management server periodically queries each of the NADs for its current version of its ACR, compares a latest version maintained by the management server, and sends necessary updates between different versions to the NADs.

8. The system of claim 1, wherein the each NAD receives same ACRs and ACPs from the management server over the Internet, and wherein the same ACRs and ACPs are used by different NADs to control network access of a first NCD when the first NCD roams across the different NADs.

9. A network access device, comprising:
an access control module to download access control policies (ACPs) and access control rules (ACRs) from a management server over the Internet, wherein the network access device is one of a plurality of network access devices (NADs) managed by the management server over the Internet, wherein each NAD of the plurality of NADs operates as one of a gateway device, a network switch, or a wireless access point to allow a plurality of network client devices (NCDs) to access a respective local area network (LAN) and to access the Internet via the respective LAN, wherein the management server includes a Web interface to allow an administrator to login and configure the ACPs for the plurality of NCDs and an ACP manager to manage the ACRs and the ACPs, wherein the ACP manager is to transmit over the Internet the ACPs and the ACRs to the plurality of NADs to allow the plurality of NADs to apply the ACPs to their respective NCDs based on the ACRs; and
a storage to store downloaded ACPs and ACRs, wherein the access control module is to enforce the ACPs against its respective NCDs based on the ACRs, wherein the access control module is to periodically communicate with the ACP manager of the management server to exchange updates of the ACRs and ACPs between the network access device and the management server,
wherein the plurality of NADs is associated with one or more network identifiers for logically grouping the plurality of NADs, wherein the ACRs are uniformly applied to one or more of the plurality of NADs that are associated with an identical network identifier, and
wherein when an NCD of the plurality of NCDs connects to the network access device and requests to enter a LAN associated with the network access device, the network access device authenticates the NCD and applies an ACR of the ACRs to the NCD, wherein the network access device further updates the ACR to indicate that the NCD has been authenticated successfully, wherein the network access device transmits information about the updated ACR to the management server over the Internet, and wherein the management server is to update the ACR stored therein and to broadcast the change of the ACR to remaining NADs of the plurality of NADs over the Internet to allow the remaining NADs to update the ACR stored therein.

10. The network access device of claim 9, wherein the network access device is a first NAD, and wherein when the NCD roams from the first NAD to a second NAD of the NADs, the second NAD applies the updated ACR that has been received from the management server, without having to authenticate the first NCD again.

11. The network access device of claim 9, wherein at least one of the ACRs includes a first rule to be applied to one or more NCDs associated with a first service set identifier (SSID) and a second rule to be applied to one or more NCDs associated with a second SSID, wherein the first and second rules are different.

12. The network access device of claim 9, wherein the each NAD receives same ACRs and ACPs from the management server over the Internet, and wherein the same ACRs and ACPs are used by different NADs to control network access of a first NCD when the first NCD roams across the different NADs.

13. A method performed by a network access device, the method comprising:
downloading, by an access control module of the network access device, access control policies (ACPs) and access control rules (ACRs) from a management server over the Internet, wherein the network access device is one of a plurality of network access devices (NADs) managed by the management server over the Internet, wherein each NAD of the plurality of NADs operates as one of a gateway device, a network switch, or a wireless access point to allow a plurality of network client devices (NCDs) to access a respective local area network (LAN) and to access the Internet via the respective LAN, wherein the management server includes a Web interface to allow an administrator to login and configure the ACPs for the plurality of NCDs and an ACP manager to manage the ACRs and the ACPs, wherein the ACP manager is to transmit over the Internet the ACPs and the ACRs to the plurality of NADs to allow the plurality of NADs to apply the ACPs to their respective NCDs based on the ACRs; and
storing in a storage the downloaded ACPs and the ACRs, wherein the access control module is to enforce the ACPs against its respective NCDs based on the ACRs, wherein the access control module is to periodically communicate with the ACP manager of the management server to exchange updates of the ACRs and ACPs between the network access device and the management server, wherein the plurality of NADs is associated with one or more network identifiers for logically grouping the plurality of NADs, wherein the ACRs are uniformly applied to one or more of the plurality of NADs that are associated with an identical network identifier, and wherein when an NCD of the plurality of NCDs connects to the network access device and requests to enter a LAN associated with the network access device, the network access device authenticates the NCD and applies an ACR of the ACRs to the NCD, wherein the network access device further updates the ACR to indicate that the NCD has been authenticated successfully, wherein the network access device transmits information about the updated ACR to the management server over the Internet, and wherein the management server is to update the ACR stored therein and to broadcast the change of the ACR to remaining NADs of the plurality of NADs over the Internet to allow the remaining NADs to update the ACR stored therein.

14. The method of claim 13, wherein the network access device is a first NAD, and wherein when the first NCD roams from the first NAD to a second NAD of the plurality of NADs, the second NAD applies the updated ACR that has been received from the management server, without having to authenticate the first NCD again.

15. The method of claim 13, wherein at least one of the ACRs includes a first rule to be applied to one or more NCDs associated with a first service set identifier (SSID) and a second rule to be applied to one or more NCDs associated with a second SSID, wherein the first rule and the second rule are different.

16. The method of claim 13, wherein the each NAD receives same ACRs and ACPs from the management server over the Internet, and wherein the same ACRs and ACPs are used by different NADs to control network access of a first NCD when the first NCD roams across the different NADs.

17. A management server for managing access control policies, comprising:
a Web interface to allow an administrator to login and configure access control policies (ACPs) of network client devices (NCDs);
a database to store the ACPs and a set of access control rules (ACRs) received from the Web interface, the ACRs defining one or more rules to apply the ACPs; and
an ACP manager to manage the ACRs and the ACPs, wherein the ACP manager is to transmit over the Internet the ACPs and the ACRs to a plurality of network access devices (NADs) to allow the plurality of NADs to apply the ACPs to their respective NCDs based on the ACRs, wherein the plurality of NADs are managed by the management server over the Internet on behalf of enterprises,
wherein the ACP manager is configured to periodically update the ACRs and ACPs stored in the plurality of NADs, including receiving an update from one network access device and broadcasting the update to a remainder of the plurality of NADs,
wherein the plurality of NADs is associated with one or more network identifiers for logically grouping the plurality of NADs, wherein the ACRs are uniformly applied to one or more of the plurality of NADs that are associated with an identical network identifier,
wherein the each NAD of the plurality of NADs operates as one of a gateway device, a router, a network switch, and an access point to allow a plurality of NCDs to access a respective local area network (LAN) and to access the Internet via the respective LAN, and
wherein when an NCD of the plurality of NCDs connects to an NAD of the plurality of NADs and requests to enter a LAN associated with the NAD, the NAD authenticates the NCD and applies an ACR of the ACRs to the NCD, wherein the NAD further updates the ACR to indicate that the NCD has been authenticated successfully, wherein the NAD transmits information about the updated ACR to the management server over the Internet, and wherein the management server is to update the ACR stored therein and to broadcast the change of the ACR to remaining NADs of the plurality of NADs over the Internet to allow the remaining NADs to update the ACR stored therein.

18. The management server of claim 17, further comprising an ACR log for logging update activities of the ACRs, wherein the ACR log includes a plurality of log entries, each log entry corresponding to an update activity of a particular ACR, wherein the each log entry includes a version number representing a time when a corresponding update activity occurs.

19. The management server of claim 17, wherein the ACP manager periodically receives a version number of each ACR from the each NAD, and wherein the ACP manager is configured to
compare a local version number of the ACR currently stored within the management server with the version number received from the each NAD, and
transmit a newer version of the each ACR to the each NAD if the local version number is higher than the received version number.

20. The management server of claim 19, wherein the ACP manager is to periodically scan the ACR log to identify an update activity that causes an ACR invalid and to remove identified ACR and its log entry from the ACR log.

21. The management server of claim 17, wherein the management server periodically queries each of the NADs for its current version of its ACR, compares a latest version maintained by the management server, and sends necessary updates between different versions to the NADs.

22. The management server of claim 17, wherein the each of the plurality of NADs receives same ACRs and ACPs from the management server over the Internet, and wherein the same ACRs and ACPs are used by different NADs to control network access of a first NCD when the first NCD roams across the different NADs.

* * * * *